(12) United States Patent
Phillips et al.

(10) Patent No.: US 12,711,434 B2
(45) **Date of Patent: *Aug. 18, 2026**

(54) OIL-FIELD ELECTRONIC RUN TICKETS

(71) Applicant: SitePro, Inc., Lubbock, TX (US)

(72) Inventors: Aaron Phillips, Lubbock, TX (US); David Bateman, Lubbock, TX (US); Britt Wuensche, Lubbock, TX (US); Jordan Kutscherousky, Lubbock, TX (US); Linlin Zhao, Lubbock, TX (US)

(73) Assignee: SitePro, Inc., Lubbock, TX (US)

( * ) Notice: Subject to any disclaimer, the term of this patent is extended or adjusted under 35 U.S.C. 154(b) by 254 days.

This patent is subject to a terminal disclaimer.

(21) Appl. No.: 18/740,318

(22) Filed: Jun. 11, 2024

(65) Prior Publication Data

US 2025/0086532 A1 Mar. 13, 2025

Related U.S. Application Data

(63) Continuation of application No. 18/085,761, filed on Dec. 21, 2022, now Pat. No. 12,020,187, which is a (Continued)

(51) Int. Cl.
*G01F 23/00* (2022.01)
*G05B 15/02* (2006.01)

(Continued)

(52) U.S. Cl.
CPC ......... *G06Q 10/0631* (2013.01); *G01F 23/00* (2013.01); *G05B 15/02* (2013.01);

(Continued)

(58) Field of Classification Search
CPC ......... G06Q 10/0631; G06Q 10/06311; G06Q 10/063112; G06Q 10/06316;

(Continued)

(56) References Cited

U.S. PATENT DOCUMENTS

2004/0024660 A1* 2/2004 Ganesh ................ G06Q 10/087 705/28
2014/0310041 A1* 10/2014 Crocker ............... G06Q 10/083 705/7.15

(Continued)

FOREIGN PATENT DOCUMENTS

WO WO-2023283169 A1 * 1/2023 ....... G06Q 10/06311

OTHER PUBLICATIONS

W. Z. Khan, M. Y. Aalsalem, M. K. Khan, M. S. Hossain and M. Atiquzzaman, "A reliable Internet of Things based architecture for oil and gas industry," 2017 19th International Conference on Advanced Communication Technology (ICACT), PyeongChang, Korea (South), 2017, pp. 705-710 (Year: 2017).*

*Primary Examiner* — Crystol Stewart
(74) *Attorney, Agent, or Firm* — Pillsbury Winthrop Shaw Pittman, LLP

(57) ABSTRACT

Provided is a process including: receiving a tank-nearly-full message indicating that a tank at an oil or gas related facility is or will be ready for a truck to unload and transport fluid accumulating in the tank; in response to the tank-nearly-full message, creating a tank-run record; sending a description of the tank-run to a mobile device of a driver of an oilfield truck; receiving, from the mobile device of the driver of the oilfield truck, a tank-run claimed message indicating that the driver will drive to the oil or gas related facility and transport at least some of the fluid accumulating in the tank; and after the tank-run claimed message, performing steps including: confirming that the tank-run has not yet been claimed; after the confirmation, designating the tank-run as claimed by the driver; and sending confirmation to the mobile device of the driver.

20 Claims, 3 Drawing Sheets

Related U.S. Application Data continuation of application No. 17/039,535, filed on Sep. 30, 2020, now Pat. No. 11,562,305, which is a continuation of application No. 15/589,226, filed on May 8, 2017, now Pat. No. 10,984,354, which is a continuation of application No. 15/455,701, filed on Mar. 10, 2017, now Pat. No. 10,740,706, which is a continuation of application No. 14/978,802, filed on Dec. 22, 2015, now Pat. No. 9,626,729.

(60) Provisional application No. 62/095,640, filed on Dec. 22, 2014.

(51) Int. Cl.

| | |
|---|---|
| ***G05D 7/06*** | (2006.01) |
| ***G06F 40/174*** | (2020.01) |
| ***G06Q 10/0631*** | (2023.01) |
| ***G06Q 10/0633*** | (2023.01) |
| ***G06Q 10/08*** | (2024.01) |
| ***G06Q 10/0834*** | (2023.01) |
| ***G06Q 10/0875*** | (2023.01) |
| ***G06Q 30/018*** | (2023.01) |
| ***G06Q 50/06*** | (2024.01) |
| ***H04W 4/021*** | (2018.01) |
| *G06K 7/10* | (2006.01) |
| *G06K 7/14* | (2006.01) |
| *G07C 9/00* | (2020.01) |

(52) U.S. Cl.
CPC ..... *G05D 7/0635* (2013.01); *G06Q 10/06311* (2013.01); *G06Q 10/063112* (2013.01); *G06Q 10/06316* (2013.01); *G06Q 10/0633* (2013.01); *G06Q 10/08* (2013.01); *G06Q 10/0834* (2013.01); *G06Q 10/0875* (2013.01); *G06Q 30/018* (2013.01); *G06Q 50/06* (2013.01); *G05B 2219/37333* (2013.01); *G06F 40/174* (2020.01); *G06K 7/10297* (2013.01); *G06K 7/1413* (2013.01); *G06K 7/1417* (2013.01); *G07C 9/00309* (2013.01); *H04W 4/021* (2013.01)

(58) Field of Classification Search
CPC ........... G06Q 10/0633; G06Q 10/0834; G06Q 10/0875; G06Q 30/018; G06Q 50/06; G06Q 50/28; G06Q 10/08; G01F 23/00; G05B 15/02; G05B 2219/37333; G05D 7/0635; G06F 40/174; G06K 7/10297; G06K 7/1413; G06K 7/1417; G07C 9/00309; H04W 4/021
See application file for complete search history.

(56) References Cited

U.S. PATENT DOCUMENTS

2015/0032491 A1* 1/2015 Ulm, Sr. .......... G06Q 10/06311 705/7.13
2020/0118087 A1* 4/2020 Cannata ................. G06Q 50/26

* cited by examiner

OIL-FIELD ELECTRONIC RUN TICKETS

CROSS-REFERENCE TO RELATED APPLICATIONS

The present application is a continuation of U.S. patent application Ser. No. 18/085,761, titled "OIL-FIELD ELECTRONIC RUN TICKETS," filed 21 Dec. 2022, which is a continuation of U.S. patent application Ser. No. 17/039,535, titled "OIL-FIELD ELECTRONIC RUN TICKETS," filed 30 Sep. 2020, now issued as U.S. Pat. No. 11,562,305, which is a continuation of U.S. patent application Ser. No. 15/589,226, titled "OIL-FIELD ELECTRONIC RUN TICKETS," filed 8 May 2017, now issued as U.S. Pat. No. 10,984,354, which is a continuation of U.S. patent application Ser. No. 15/455,701, titled "OIL-FIELD TRUCKING DISPATCH," filed 10 Mar. 2017, now issued as U.S. Pat. No. 10,740,706, which is a continuation of U.S. patent application Ser. No. 14/978,802, titled "OIL-FIELD TRUCKING DISPATCH," filed 22 Dec. 2015, now issued as U.S. Pat. No. 9,626,729, which is a non-provisional of, and thus claims the benefit of, U.S. Provisional Patent Application 62/095,640, titled "OIL-FIELD TRUCKING DISPATCH," filed 22 Dec. 2014. The entire content of each afore-mentioned patent filing is hereby incorporated by reference.

BACKGROUND

1. Field

The present disclosure relates generally to dispatch systems and, more specifically, to systems for dispatching truckers for transporting fluids between oil or gas related facilities.

2. Description of the Related Art

Oil or gas related facilities, such as oil wells, gas wells, salt-water disposal facilities, oil collection points, and the like, often rely upon tanker trucks to transport fluids to or from the facilities, often through relatively remote and expansive geographic areas. Frequently, the truck drivers are independent contractors or independent parties from the operators of the oil or gas related facilities, making coordination with well operators and various parties difficult and labor intensive. Further, truck drivers often make sub-optimal choices when selecting tank runs, or fluid transport tasks between given oil or gas related facilities, due to the complexity of factors underlying the value of the various candidates and due to lack of information about, for example, low capacity or slow capacity to accept fluid at drop-off points at the time drop of is likely.

SUMMARY

The following is a non-exhaustive listing of some aspects of the present techniques. These and other aspects are described in the following disclosure.

Some aspects include a process including: receiving, at a driver dispatch server system, a tank-nearly-full message indicating that a tank at an oil or gas related facility is or will be ready for a truck to unload and transport fluid accumulating in the tank; in response to the tank-nearly-full message, creating a tank-run record, the tank-run record specifying a tank-run and identifying the oil or gas related facility and indicating a need for a truck to unload and transport fluid; sending a description of the tank-run to a mobile device of a driver of an oilfield truck; receiving, from the mobile device of the driver of the oilfield truck, a tank-run claimed message indicating that the driver will drive to the oil or gas related facility and transport at least some of the fluid accumulating in the tank; and after the tank-run claimed message, performing steps comprising: confirming that the tank-run has not yet been claimed by another driver; after the confirmation, designating the tank-run as claimed by the driver; and sending confirmation to the mobile device of the driver that the tank-run has been claimed by the driver.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
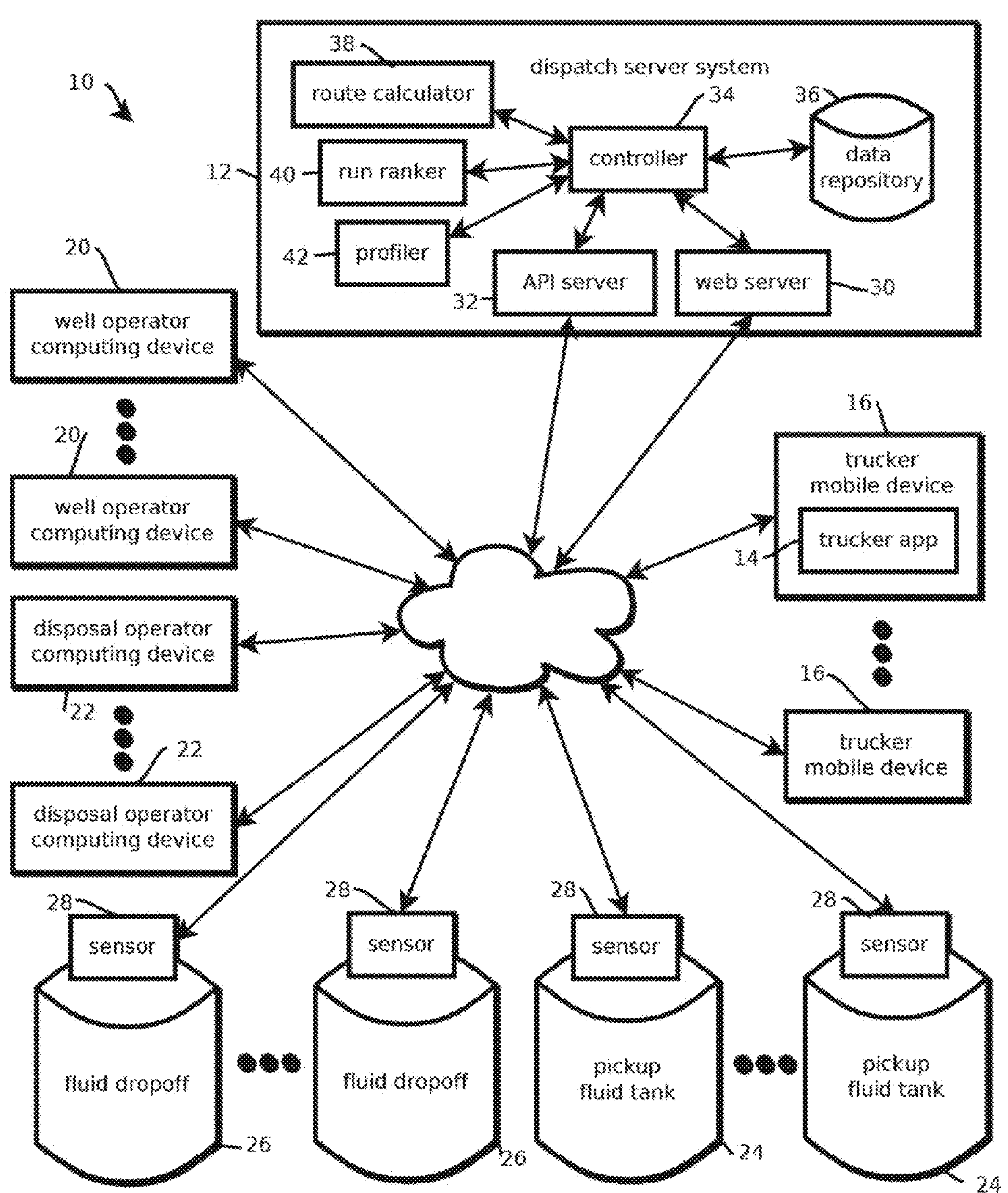
FIG. 1 illustrates an example of a dispatch server system.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the petroleum industry. Indeed, the inventors wish to emphasize the difficulty of recognizing those problems that are nascent and will become much more apparent in the future should trends in industry continue as inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

FIG. 1 shows an example of a computing environment 10 having a dispatch server system 12 that is expected to mitigate some (and in some embodiments all) of the above-described issues with traditional systems. In some cases, the dispatch server system 12 cooperates with a native mobile application 14 executed by mobile devices carried by truckers 16. In some cases, the application 14 and dispatch server system 12 may help truckers identify tank runs for which they are qualified (e.g., by operators of the relevant facilities), choose among those tank runs, and coordinate with various other stakeholders, such as well operators and disposal facility operators. In some cases, the application 14 is operative to obtain a current geolocation of the trucker, for example, based on a location sensor of the trucker's mobile device, and present a personalized and location relevant collection of tank runs to the trucker. In some cases, upon a trucker claiming a given tank run, that tank run may be designated as claimed by the dispatch server system 12, such that other truckers do not also incur the cost of driving to a corresponding oil or gas related facility. Such coordination is traditionally relatively difficult because, among other reasons, typically many different truckers, each working for different entities, service many different oil or gas related facilities, each operated by many different entities, with different entities controlling the pick-up and drop-off points. Further, due in part to this complexity, selecting among tank runs and scheduling tank runs has been relatively difficult for truck drivers, as the optimal selection often depends on trucker-specific, load-specific, and dynamic drop-off location specific factors, some of which are unknown to the trucker.

In some embodiments, sensors at the fluid pickup or drop-off points inform the process of selecting a tank run and scheduling a tank run. In some cases, the sensors are placed in communication with the dispatch server system 12 by the Internet 18 and a site master controller described with greater detail below. In some embodiments, a sensor at an oil well or a gas well senses a level of fluid, such as a liquid, like oil or saltwater, in a tank, and a determination is made that a tank run is needed to unload fluid accumulating in the tank. In some cases, the determination is made by a site master controller (again described below), by the dispatch server system 12, or by a human operator, or other system. In some cases, the determination is made based on a known capacity of the tank held in memory, an identifier of the tank, a fluid level of the tank currently sensed, and a rate at which fluid is accumulating in the tank, which may be determined based on a rate of change of the fluid sensor or a flowrate sensed by a flowrate sensor of a pipe coupled to the tank. In some embodiments, each oil or gas related facility may have a unique identifier and each be associated with a plurality of tanks, each tank having a unique tank identifier and a record indicating the type of fluid in the tank, such that the appropriate type of tank run can be scheduled, e.g., a tank run to dispose of saltwater, or a tank run to convey oil. (The term saltwater is used herein to refer to liquids to be conveyed to a saltwater disposal facility, but should not be understood to indicate that those liquids are devoid of oil, as many saltwater facilities extract oil from the saltwater delivered before disposing of the saltwater.) Some embodiments (e.g., of a site master controller or system 12) may calculate based on this data an earliest time at which the tank should be unloaded (e.g., to avoid an un-economical tank run that unloads an insufficiently full tank) and a latest time at which the tank should be unloaded (e.g., to avoid overflowing the tank or having to stop production). In some embodiments, one or more of these times may be conveyed to (or calculated by) the dispatch server system 12, along with an identifier of the oil or gas related facility and the tank or type of fluid to be conveyed.

In some embodiments, well operators and disposal facility operators may white list, blacklist, or apply various criteria to qualify drivers to pick-up or drop-off at their facilities. For example, some well operators or disposal facilities maintain contracts that only permit certain drivers or certain entities employing drivers to drop off or pick up at their sites. In another example, some well operators or disposal facilities may only permit drivers having certain credentials, equipment with certain capabilities, or certifications to use their facilities. Some embodiments may receive these criteria from computing devices of well operators and disposal facility operators 20 and 22. In some embodiments, the dispatch server system 12 may send an interface to the computing devices 20 and 22, such as a webpage with web forms, by which the relevant parties may enter search criteria and create accounts with the dispatch server system 12. In some embodiments, these accounts may include identifiers of facilities controlled by a given operator, login credentials of a given operator, roles and permissions of employees of a given operator, driver criteria, and billing information, such as subscription amounts or billing for per usage activities.

Commercial implementation are expected to be expansive. FIG. 1, by way of example, shows two pick-up fluid tanks 24 and two fluid drop-off tanks 26, each having one or more respective network connected sensors 28, but it should be understood that embodiments are consistent with substantially more instances of these components, as well as more of the mobile devices 16, and of the computing devices 20 and 22. In some cases, the number of tanks may number in the tens of thousands, the number of truckers may number in the thousands (e.g., more than 100, more than 1000, or more than 10,000), and the number of operators may number in the thousands, or more (e.g., more than 100, more than 1000, or more than 10,000). The pickup tanks, in some embodiments, may be tanks holding oil, saltwater, or the like, at an oil or gas well, and the drop-off tanks 26 may be oil collection facilities or saltwater disposal facilities. In some cases, the drop-off tanks 26 may feed into a system that accepts fluids at some constrained rate, such as an oil or gas pipeline or a subsurface geologic structure for accepting saltwater. Further, in some cases, the drop-off facilities may have a limited number of inputs by which truckers can drop-off fluid concurrently. Due to these constraints, fluid drop-off times may vary considerably based on the number of truckers attempting to drop off fluids around the time of the tank run, the specific constraints of a given facility, and the amount of fluid dropped off in the recent past that is not yet been pumped from the tanks 26 into the appropriate receptacle. Accordingly, in some cases, it can be difficult for truckers to select the drop-off facility. Some truckers may choose a disposal facility that is the closest to the fluid tank at which the fluid was picked up, but those facilities at which they drop-off may be particularly slow at the time of drop off for the particular load being conveyed, and it may be and advantageous to select a different, somewhat further facility. Further, without knowing which drop-off facility to use, it can be difficult for truckers to select among candidate tank runs, as a tank run that appears relatively short at first glance, may be relatively time intensive when fluid drop-off times are accounted for under the conditions when the trucker is likely to drop off the fluid.

In some cases, the time to drop off at a disposal facility is also a function of the quality and type of fluid the trucker is conveying. For example, some oil wells have a history of producing high viscosity fluid that some disposal facilities are particularly slow accepting. Some embodiments may account for this load-specific factor when selecting among or recommending disposal facilities based on drop-off time. Further, some disposal facilities will only accept fluids with certain properties, such as a threshold percentage or smaller solids in the fluid. In some cases, these constraints are accounted for when selecting among disposal facilities. For example, some embodiments may maintain records of historical percent solids from a given well sent by a disposal facility operator after drop-offs, and use those historical percent solid records to infer that future percent solids will be consistent and only select those disposal facilities that can accept those percent solids. In another example, a site master controller may take measurements of percent solids based on a current tank accumulation (e.g., with an attached suspended solids density meter), and those measurements may be sent to the dispatch server system when requesting a tank run.

Some embodiments may predict congestion at facilities. For example, some embodiments may track truckers that have claimed tank runs to a given disposal facility (in some cases tracking the geolocation of the trucker, or in other cases predicting an arrival time based on their current geolocation at the time of selection and predicted travel times or distances) and predict how long before drop-off is expected tank for the trucker at issue given the constraints of the disposal facility, the schedule of predicted drop-offs for the trucker and at the same time as the trucker, and the amount and type of fluid the trucker would be dropping off for a given tank run the trucker is considering. Based on this drop-off time, and transportation times or distances, some embodiments may score candidate tank runs for the particular driver, in some cases ranking the candidate tank runs based on the score, or selecting subsets of the candidate tank runs scoring above a threshold. Those candidate tank runs may be sent to the trucker app 14 for consideration by the trucker.

In some embodiments, the dispatch server system 12 may assist truckers with these determinations, and provide recommendations or curate candidate tank runs presented through the trucker application 14 on trucker mobile devices 16. In some embodiments, a trucker may launch the trucker app 14, request candidate tank runs (the request identifying the trucker to the dispatch server system 12 and providing the geolocation of the trucker), and receive a list of candidate tank runs for which the trucker is qualified, along with guidance about the profitability of those candidate tank runs, in some cases taking into account predicted delays at drop-off due to the above-described constraints. Recommendations may be based on a predicted best drop-off facility, but the trucker may choose other facilities. Accordingly, some embodiments may request the trucker to identify the other facility.

In some embodiments, operators of disposal facilities may maintain records of scheduled disposals with the dispatch server system 12, for example scheduling drop offs of the scope of those associating with flow back from a given fracking operation, which may generate a substantial amount of traffic over a relatively predictable duration of time. Some embodiments of the dispatch server system 12 may query those records to select among disposal facilities, thereby directing truckers away from congested disposal facilities.

In some cases, a trucker may view these candidate tank runs, select a given tank run to claims, and a message may be sent responsive to the selection to the dispatch server system 12 indicating the request to claim the tank run. In response, the dispatch server system 12 may determine whether another trucker has claimed that tank run in the interim, and upon determining that the tank run remains unclaimed, designate that tank run as claimed by that trucker, and send confirmation to that trucker. In some cases, the confirmation is sent with directions to the corresponding fluid pickup tank 24 and the corresponding fluid drop-off 26. In some embodiments, upon claiming a tank run, some embodiments may send a recommendation regarding which fluid drop-off facility to use, for example, based upon the above-describes factors that affect the time of drop-off, as well as travel time and distance between the pickup and drop-off points.

Parties may be billed for use of the dispatch server system 12 through a variety of different techniques. In some cases, a truckers account may be billed a fixed amount or a percentage amount for each tank run that trucker claims, or operators of oil wells or disposal facilities may pay a subscription for access to the dispatch server system 12 or for preferential presentation of their tank runs or their disposal facilities, or they may also be billed on a per-run basis. In some embodiments, advertisements may be selected based on historical usage patterns or current context of the trucker, or operators, and those advertisements may be presented on the corresponding application, webpage, or the like being viewed by the relevant party. In some cases, truckers or operators may bid for the services described herein, and winners may be selected in periodic auctions and a percentage of the proceeds may be billed to the winner. In some cases, prices may be dynamically adjusted based on estimated supply and demand, e.g., increasing the compensation for tuckers in a geographic area in response to the number of truckers in the geographic area dropping below a threshold amount.

In the illustrated embodiment, information may be maintained about truckers to facilitate trucker selection by well operators, for example, when pre-approving truckers. In some cases, a trucker's statistics regarding on-time arrival, failure-to arrive, and inferred driving speeds (for instance, based on differences between pick-up and drop-off times and known or recommended routes) may be maintained and presented to operators, such that operators can select reliable and safe truckers. In some embodiments, a trucker's recent history of tank runs may be maintained in memory, and before a trucker is presented with a tank run, or before a trucker is allowed to claim a tank run, that history may be interrogated for compliance with various regulations regarding the amount of time truckers can spend driving, for instance, by calculating an estimated total amount of time the trucker has spent driving or working during a trailing duration, like during the preceding five days. That amount of time may be compared to a threshold amount of time to determine whether the trucker is permitted to view or claim new tank runs. In some embodiments, truckers may be incentivized to drive safely and be reliable based on the access truckers are granted to candidate tank runs. For example, when a given trucker request candidate tank runs to select a new job, some embodiments may delay certain tank runs that that trucker would otherwise be presented with to give other truckers a chance to claim those tank runs because that given trucker has a record of poor performance.

In some embodiments, run tickets may be created with the trucker app based on the data resident in the dispatch server system, the context provided by a tank run at hand, and information entered by the trucker during the tank run. These electronic run tickets may be sent to (or accessed online by) the corresponding well operator or disposal facility operator for invoicing purposes and to track the conveyance of fluid through the oil and gas fields. In some embodiments, additional data for the run tickets may be acquired at the oil or gas related facility, for example, based on a wireless connection directly between the trucker mobile device, under the instruction of the trucker app 14, and a site master controller. For example, a trucker may place their mobile device near a near field communication device, or other wireless transmitter, like a Low Energy Bluetooth™ beacon, at the oil or gas related facility, and the data wirelessly exchanged (e.g., a unique identifier of the trucker or a unique identifier of the facility or tank) may be sent to the dispatch server system 12 to confirm the trucker's presence at the facility at the appropriate time.

As shown in FIG. 1, the dispatch server system 12 may include a variety of components that effectuate the operations and features described herein. In some embodiments, the dispatch server system 12 may include a web server 30 that presents a web interface, an application program interface server 32 operative to communicate with the trucker app 14 and various third-party computers as needed, a controller 34 to direct the operation of the other components, a data repository 36 that stores the records described herein, a route calculator 38 for calculating travel times and distances and recommending routes, a run ranker 40 for scoring candidate runs for a given driver, and a profiler 42 for calculating statistics by which disposal facilities, wells, and truckers are profiled. The dispatch server system 12 may be built from a plurality of computer systems, such as those described below with reference to FIG. 3, and maybe geographically remote from the other components of FIG. 1. In some embodiments, the route calculator 38 may interface with a third-party provider of mapping information, who may also provide routes upon queries specifying a start and a destination.

Similarly, the well operator computing devices and 20 and the disposal operator computing devices 22 may be mobile devices or various other types of computing devices, such as desktop computers, laptops, tablets and the like, examples of which are described below with reference to FIG. 3. The trucker mobile device 16 may be, for example, a cell phone, a tablet computer, a laptop, and in-dash car computer, or the like, again examples of which are described below with reference to FIG. 3. In some embodiments, the trucker mobile device 16 may include a portable power supply, like a battery, a wireless interface, and a location sensor, such as a global positioning system (GPS) sensor, operative to sense a current geolocation of the trucker mobile device for the trucker app 14.

Figure 2:
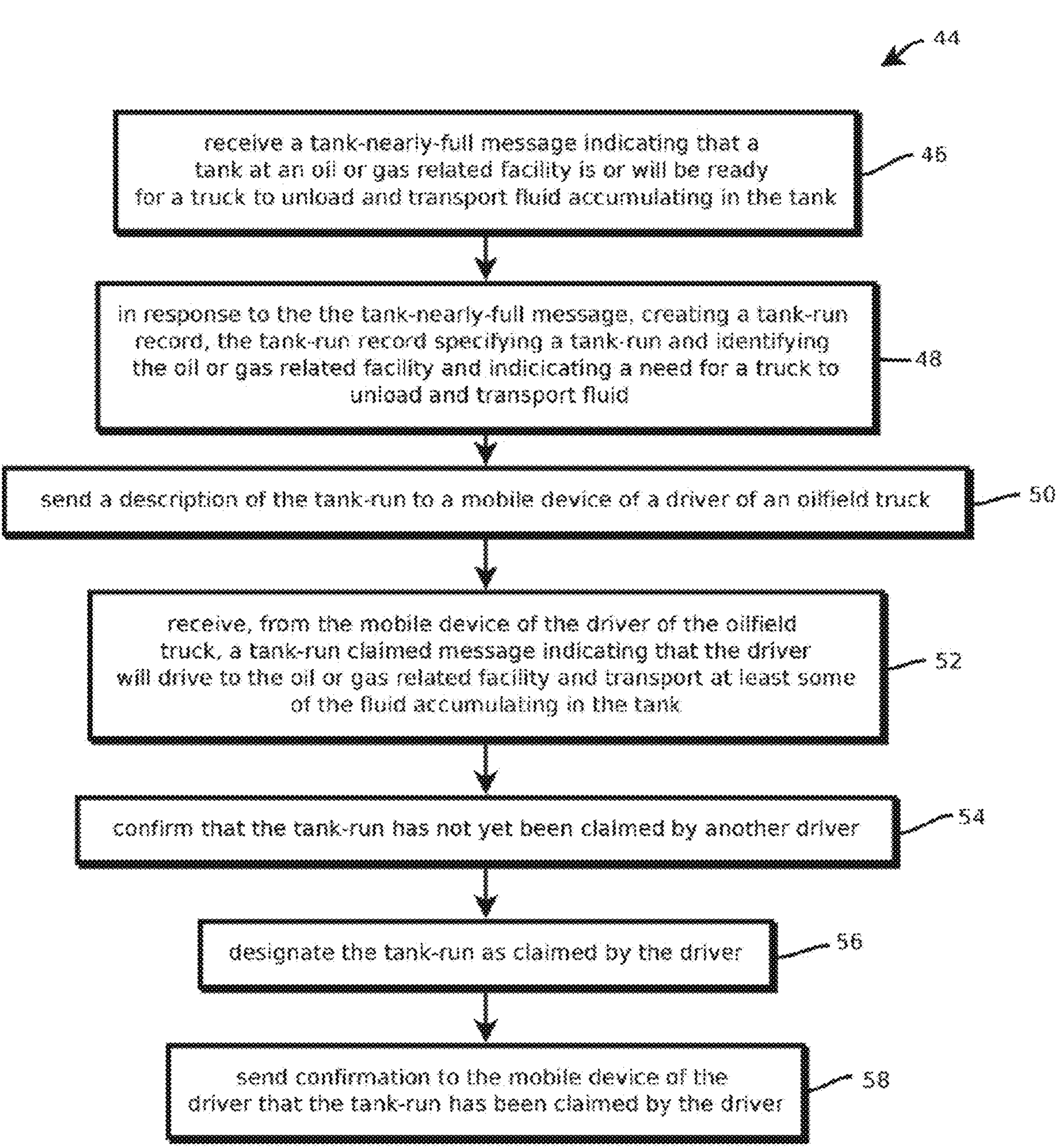
FIG. 2 shows an example of a process performed by the dispatch server system.

FIG. 2 shows an example of a process 44 that may be performed by the dispatch server system 12 of FIG. 1. In the illustrated embodiment, the process 44 may include receiving a tank-nearly-full message indicating that a tank at an oil or gas related facility is or will be ready for a truck to unload and transport fluid accumulating in the tank, as indicated by block 46. Next, in response to the tank-nearly-full message, some embodiments may create a tank-run record, the tank-run record specifying a tank-run and identifying the oil or gas related facility and indicating a need for a truck to unload and transport fluid, as indicated by block 48. Next, some embodiments may send a description of the tank-run to a mobile device of a driver of an oilfield truck, as indicated by block 50, and receive, from the mobile device of the driver of the oilfield truck, a tank-run claimed message indicating that the driver will drive to the oil or gas related facility and transport at least some of the fluid accumulating in the tank, as indicated by block 52. Next, some embodiments may confirm that the tank-run has not yet been claimed by another driver, as indicated by block 54, and designate the tank-run as claimed by the driver, as indicated by block 56. Some embodiments may then send confirmation to the mobile device of the driver that the tank-run has been claimed by the driver, as indicated by block 58.

In some embodiments, oil or gas related facilities may be monitored or controlled by the site master controller described in U.S. Pat. No. 8,649,909, titled "REMOTE CONTROL OF FLUID-HANDLING DEVICES," filed Dec. 7, 2012, the entire contents of which are incorporated by reference in their entirety. Further, some embodiments may integrate the dispatch server system with the command-center server described in this document, e.g., providing access to tank levels or passing messages regarding needed or completed tank runs via an application program interface to the command-center server. Further, some embodiments may exchange data regarding various operators via such an API, e.g., operator identifiers, lists of oil or gas related facilities under an operator's account, geolocations of such facilities, contact information for operators, and the like. In some cases, the dispatch server system may pass messages to the command-center server that cause the command center server to control oil or gas related facilities based on tank runs being coordinated by the dispatch server system, e.g., issuing commands to lock or unlock gates or wells to grant access to an expected trucker on a claimed tank run, issuing commands to close a valve or slow a pump to slow flow into a tank based on an estimated arrival time of a trucker that claimed a tank run (or open a valve or accelerate a pump to speed access), or send data that is conveyed to the trucker at the site (such as data for populating a run ticket) via a local wireless connection (e.g., WiFi, Bluetooth, or near-field communication) to a mobile device of the trucker by the site master-controller. In some cases, a site master-controller may be positioned at both a pick-up site, like an oil or gas well (thereby providing, in some use cases, automatic updates regarding tank levels and accumulation rates to signal a time at which a tank run is needed and a type of fluid to be conveyed) and at a drop-off site, like a salt water disposal facility (thereby providing real-time data about the capacity, and flow rate, of a facility to accept fluid and possibly indicating that a more distant facility is faster for the trucker due to faster rates of accepting fluid).

Integrating both sides of these transfers with the site master-controllers, the command-center servers, and the dispatch server system is expected to lead to more efficient dispatching of drivers, higher production from wells that may otherwise lack tank capacity, fewer trips by drivers as tanks runs can be scheduled for just-in-time unloads, and more efficient usage of salt-water disposal facilities. That said, not all embodiments provide all of these benefits, as various cost and engineering tradeoffs are envisioned.

Some embodiments may provide network access to drivers and the site master-controllers in geographically remote areas via wireless mesh networking techniques described by U.S. patent application Ser. No. 14/299,723, filed Jun. 9, 2014, titled "MULTI-PATH WIRELESS MESH NETWORKS IN OIL AND GAS FIELDS," and U.S. Provisional Application 62/010,729, filed Jun. 11, 2014, titled "AD HOC WIRELESS MESH NETWORK FOR OIL AND GAS EQUIPMENT," the content of both of which is hereby incorporated by reference in its entirety for all purposes. For instance, some embodiments may convey information about tank levels and driver status via such networks at a relatively low cost even in geographically remote areas. That said, not all embodiments provide all of these benefits, as various cost and engineering tradeoffs are envisioned.

Some embodiments may monitor driver pick-ups and drop-offs with a mobile surveillance unit (and related server system) described by U.S. Provisional Patent Application 62/060,068, titled "MOBILE SURVEILLANCE UNIT," filed Oct. 6, 2014, the entire content of which is hereby incorporated by reference in its entirety for all purposes. For instance, in some embodiments, the dispatch server system may send a request to the command-center server to capture images (e.g., video) during a duration of time at which a pick-up or drop off is scheduled and send a link to a corresponding video feed to an operator having an account associated with the facility. In some cases, upon scheduling a tank run, some embodiments of the dispatch server system may message the command-center server with a message indicating that a driver will be at a given facility at a given time, so that the command-center server can disregard movement sensed by the cameras as authorized. In embodiments configured to OCR license plates, in some cases, the dispatch server system may retrieve a trucker's license plate number from memory and send that identifier with the message. In response, the command-center server may determine whether a detected license plate in a captured image corresponds to the expected trucker and upon detecting a match, signal the dispatch server system that the trucker has arrived, or upon failing to detect a match, signal an operator that unauthorized access may be occurring. In some cases, video of the trucker at the facility (or a link thereto) is sent by the command-center server to the dispatch server system, such that the video may be associated with the tank run for later review in the event of a dispute or an injury. In some cases, the dispatch server system will request the command center server to signal if no movement is detected in video at the facility (e.g., by detecting more than a threshold number of pixels between frames are different) during a duration of time specified by the request, thereby indicating that a trucker has not arrived at the facility for a claimed tank run. Integrating the mobile surveillance unit with the dispatch server system is expected to make trucking operations more efficient, as operators will be able to hold truckers accountable in the event of a dispute and avoid false alarms when authorized truckers arrive. That said, not all embodiments provide all of these benefits, as various cost and engineering tradeoffs are envisioned.

In some embodiments, various safety related features may be provided. For instance, in some embodiments, the trucker application 14 may monitor the geolocation of the trucker and, in response to the trucker being detected in certain geographic areas, take certain actions related to those areas. For instance, some embodiments may specify geofences around fluid-related sites (e.g., with a centerpoint and radius or polygon), or detect wireless networks at those sites, and in response to determining that a geofence is traversed, or that a wireless signal is present, present instructions related to the site to the driver. For example, some embodiments may select a safety survey corresponding to the site and present a series of questions, checklist items, or the like to the driver via the application 14, and receive and log driver responses (e.g., buffering responses in memory of the mobile device 14 for transmission to the system 12 for logging upon Internet access being detected). For example, some embodiments may present an interface asking whether the driver is wearing proper shoes, proper fire-retardant clothing, and proper headgear in a sequence of questions and, then, log driver responses (e.g., selections of checkboxes entered by touching icons on a screen of device 16) in memory of the application 14 for return to, and logging at, the system 12.

Some embodiments of application 14 or system 12 may detect whether a driver has provided acceptable answers, and in response, signal a site master controller (e.g., via a local wireless area network) to unlock various interlocks on a fluid-handling site. For example, the application 14 may communicate to a site master controller a signal indicating that the driver has provided acceptable answers to the survey, and in response, the site master controller (e.g., coupled to one of the sensors 28) may open a valve, unlock a solenoid holding a gate or valve in a locked position, or engage a pump by which a trucker delivers or retrieves fluid from the site. In some embodiments, non-safety-related items may also be presented, such as instructions to log various sensor readings or inspect equipment for wear, and similar responsive actions may be taken. In some cases, data for constructing these interfaces and rules for responding to various answers provided by the trucker may be cached by application 14 in advance, e.g., upon a trucker claiming a tank run. As a result, driver compliance with various instructions may be rendered more likely even when cellular access is not provided, though some embodiments may also communicate via cellular access. Further, in some embodiments, security may be enhanced. In some cases, the dispatcher system 12 sends a message to the site master controller that instructs the controller to only unlock a valve for a designated trucker (e.g., as indicated by a MAC address of their phone on a local area network or other access code provided by the trucker, for instance, by manually keying in the code or signaling or scanning a NFC transceiver with their phone). In some cases, the transfer of fluid is measured by the site master controller, e.g., by sensing changes in tank levels or integrating signals from flow rate sensors. These values may be queried by the application 14 and cached in memory of the trucker's mobile device, so that when they drop off the fluid, or otherwise regain network access, that information may be then reported to system 12 by application 14.

In some embodiments, the application 14 may also monitor, log, and report various safety related items related to movement of the truck. For instance, some embodiments may periodically poll an inertial measurement unit of the mobile device 16 and a location sensor of the mobile device 16 to capture data for and then calculate various statistics about speed and acceleration of the truck, such as maximums, medians, means, or minimums, during a tank run. These statistics may be reported to system 12 (e.g., after buffering, in case wireless access is temporarily unavailable), and the system 12 may compare the statistics to various rules, such as speed limits or limits on acceleration specified by companies hiring truckers. Some embodiments may calculate statistics on rule violations by drivers or generate reports on such violations to assist with enforcing compliance.

In some embodiments, the application 14 may also interface with the truck's onboard computer system, for example via a Bluetooth™ ODB-II adapter (or other in-vehicle monitoring system) by which the application 14 may poll various registers of the car's onboard computer. For instance, in some embodiments, the application 14 may periodically poll such registers and determine, based on responsive values, compliance with environmental regulations or compliance with maintenance requirements. Again, this data may be compared by the system 12 to various company-specific rules, and reports may be generated to assist with enforcing compliance. Or in some cases, drivers with more than a threshold amount of violations may be down-ranked in various driver rankings, or removed from the rolls of available drivers in response.

In some embodiments, other electronic devices in a truck may interface with the application 14. For example, some embodiments may include a 900 MHz network gateway in the truck that interfaces between the device 16 (e.g., application 14) and proximate computing devices, thereby forming a wireless network associated with the respective truck. In some embodiments, site master controllers may also include a 900 MHz wireless radio, and as the truck drives within range of respective fluid-handling sites, data may be transferred via a temporary wireless connection to the device 16 for storage in a buffer. In some cases, the network gateway in the truck may relay data transferred over the 900 MHz connection to the application 14 via a WiFi or Bluetooth connection. Later, when the application 14 detects that the wireless device 16 has Internet access, in response, the application 14 may query the buffer and, in response to detecting unsent data, transfer buffered data to the system 12. In some embodiments, when a driver selects a run, some embodiments of the system 12 may determine which sites the driver will drive within range of, and add data to the mobile device's buffer for those sites. Later, when the application 14 detects such a wireless network, the application 14 may query the buffer for data for that site and transfer the data to the local site master controller, thereby facilitate exchange of data in remote areas. Further, it should be noted that embodiments are not limited to exchanges with sites using site master controllers, as data may also be exchanged with more traditional SCADA systems via a 900 MHz network gateway positioned at the site.

In some cases, upon a driver crossing a geofence, or being determined to be within some threshold distance or drive time to a site, a site master controller may receive a driver-arrival-imminent signal from the application 14 and take responsive action. In some cases, drivers waste time when they arrive at sites waiting for various systems to be prepared to process fluid, e.g., waiting for tanks to transfer fluid to other receptacles (like other tanks or down-hole) to make room to receive a fluid being hauled by a driver, like salt water for reinjection. In some embodiments, upon being signaled, the site master controller may execute a routine that begins these processes in advance. For example, in response to such a signal, some embodiments may 1) query a tank level sensor and determine whether the tank has sufficient capacity to receive a load of the expected size; 2) upon determining that insufficient capacity is present, open a valve between two tanks or a well and, then, begin transferring fluid from a receiving tank to the other tank or well by engaging a pump. In some cases, when the driver arrives, e.g., approximately 30 minutes later, the site is ready to receive fluid being hauled without the driver waiting for the site to be prepared, as the receiving tank has been unloaded sufficiently to receive the transferred fluid. In some cases, the amount of time before arrival may be inferred from crossing a geofence, completing an earlier task in a sequence of tasks (like a pickup from a previous site), geographic distances and traveling speed, or combinations thereof. The estimated arrival time may be compared to a threshold time by application 14 to determine when to send the signal.

In some embodiments, data may be downloaded from a site master controller (or other controls system) by the application 14 when a driver delivers or picks up fluid. For instance, some embodiments may query such a system for changes in sensed tank levels indicative of fluid transfer, and in some embodiments, these changes may be reported to the system 12 as part of an electronic run ticket. Or in some cases, such values may be compared against trucker-entered values to identify likely anomalous entries. In some embodiments, upon detecting a disparity between these values, the driver may be presented with an interface by which the driver may elect to replace the driver entered value with the automatically sensed value. In some cases, a fluid-handling site may have different identifiers (and corresponding different QR, barcode, or NFC identifiers) for sub-components of the site, such as tanks, valves, and pumps, and drivers may scan these sub-codes before interacting with the respective components, e.g., for a tank, before loading fluid into or out of the tank. Resulting fluid level changes (e.g., as sensed by sensors on the tanks and reported by a site master controller) may be associated with the corresponding task of the driver.

As a result, in some embodiments, equipment may be transferred between sites, and the codes for the equipment may be re-mapped to the different sites in system 12 to facilitate equipment tracking and accurate data acquisition. In some cases, each site may be associated with a unique site identifier and a list of codes of equipment at that site in the system 12. Such site identifiers, in some cases, may also be associated with "authorization for expenditure" (AFE) tracking codes indicating how fluid handling work and products for that code should be tracked in various accounting systems. Exported data may include mapping of these codes to expenditures and fluid transfers. This practice is expected to be particularly helpful for co-mingled locations, in which a single site has some equipment operating under an AFE, corresponding to capital expenditures (e.g., for handling flow-back after fracturing a well), and other equipment operating under non-capital expenditures (e.g., for handling saltwater in produced fluids).

In some embodiments, data entered into the application 14, either automatically or manually, may be associated with a site by the application 14. For example, in some cases, a driver may scan a QR or other optical or RF code available at a site, and subsequent entries may be associated with a unique identifier of the site by the application 14 and system 12. Such features are expected to facilitate more reliable data entry. In other cases, the geolocation of the mobile device 16 may be sensed, associated with acquired data, and later correlated (e.g., by application 14 or system 12) with known geolocations of fluid handling sites, e.g., from databases of such sites available from regulatory agencies. In some cases, when a trucker is unsure of which site to use, they may request an interface presenting a map of the area, their current location, and the location of proximate sites. Upon the trucker selecting one of those sites (e.g., by touching an icon), the site may be associated with a subsequent transaction. Examples of an interface by which maps of sites are presented are included in FIG. 5 of U.S. Provisional Patent Application 62/095,640 incorporated by reference, along with several other interfaces of some embodiments of application 14 shown in FIGS. 3-17 of that application.

In some embodiments, resulting electronic run tickets may be fed by application 14 into a ticket processing workflow hosted by the system 12. For instance, different entities that process the tickets may view electronic tickets; enter edits, approvals, or comments; and view the status and comments associated with each ticket. System 12 may update records to reflect user interactions, e.g., from a remote computer entered via a web browser, and send instructions to display those records to the user computers. Users may have roles and permissions associated with the workflows and enforced by system 12. In some cases, the ticket workflow may be presented via a remote mobile device or desktop device, for example, via a web browser interface. This is expected to substantially reduce processing costs for run tickets compared to traditional techniques. Task lists for various parties using the system 12 to process run tickets may be maintained by system 12, and users may view those task list and select run tickets for which their interaction is needed to advance the run ticket through the workflow. In some cases, an interface may be sent by system 12 presented on a user computer by which a user may approve, modify, reject, or comment on the run ticket. In response, the system 12 may update a corresponding record for the run ticket, and other parties may view the changed record. In some cases, the run ticket may then be added to a task list for another user. Upon a workflow being completed, a corresponding run ticket may be designated as locked, and corresponding accounting data may be exported to various accounting or enterprise resource planning systems. In some cases, a template may be stored (e.g., in a middleware module) for each user, and template may map standardized run ticket fields to values in user-specific ERP systems. During an export, the standardized format may be converted by the module into a ERP-system specific format corresponding to the user, like in a serialized data format such as XML or JSON configured for ingest into the ERP system.

In some embodiments, data acquisition by truckers and fluid-handling duties may be simplified by some of the present techniques. For instance, a driver may be dispatched on a sequence of tasks at various sites by the system 12, and the driver may then travel to the first of those sites. Upon arrival, the application 14 may communicate with a local site master controller wirelessly to indicate the driver's presence, and the site master controller may unlock various valves and engage various pumps corresponding with the trucker's task at that site. When the trucker leaves or prepares to leave, data indicating amounts of fluid being hauled are acquired from sensors coupled to the site master controller by the application 14 for reporting to system 12 or application 14. As the trucker drives to the next site, the next site may begin transferring fluid from a holding tank to a processing tank to make room for the (known) amount of fluid the trucker is hauling, as indicated by the data acquired by the application 14 and reported by the application 14 to the system 12 and then to another site master controller at the next site. When the trucker arrives at the next site, a similar process may unfold, simplifying the process of transferring the fluid and accounting for the work.

Other techniques may be employed to further simplify trucker data entry and onboarding to the illustrated system. For instance, a registry of known operating entities may be maintained in memory, and trucker entered values to indicate one of these entities may be compared (e.g., by edit distance or similarities in phonetic representations) to the registry to identify likely misspellings and suggest corrected matches (or to suggest completed values upon partial entry). These corrected options may be presented to the trucker as an option for submission during data entry, e.g., on device 16 through application 14.

Some embodiments may also facilitate the onboarding of new entities hiring truckers. For instance, in some embodiments, previously logged data from site-master controllers or state agencies may be stored in memory and associated with a user before that user creates an account. When the user then signs in for the first time, this data may prepopulate their account and inform various automated determinations.

Figure 3:
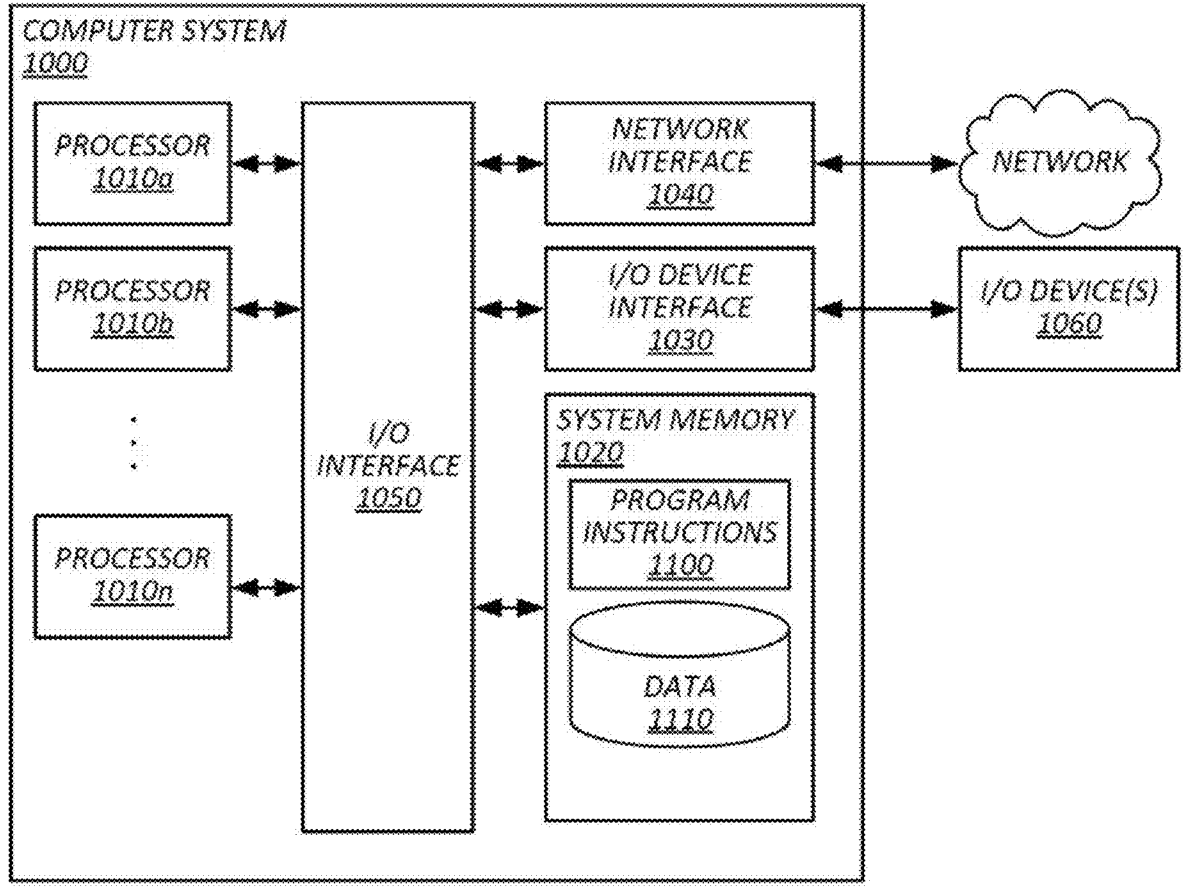
FIG. 3 shows an example of a computer system by which the above systems and processes may be implemented.

FIG. 3 is a diagram that illustrates an exemplary computing system 1000 in accordance with embodiments of the present technique. Various portions of systems and methods described herein, may include or be executed on one or more computer systems similar to computing system 1000. Further, processes and modules described herein may be executed by one or more processing systems similar to that of computing system 1000.

Computing system 1000 may include one or more processors (e.g., processors 1010*a*-1010*n*) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010*a*), or a multi-processor system including any number of suitable processors (e.g., 1010*a*-1010*n*). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010*a*-1010*n*) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010*a*-1010*n*) to cause the subject matter and the functional operations described herein. A memory (e.g., system memory 1020) may include a single memory device and/or a plurality of memory devices (e.g., distributed memory devices).

I/O interface 1050 may be configured to coordinate I/O traffic between processors 1010*a*-1010*n*, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010*a*-1010*n*). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present invention may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several inventions. Rather than separating those inventions into multiple isolated patent applications, applicants have grouped these inventions into a single document because their related subject matter lends itself to economies in the application process. But the distinct advantages and aspects of such inventions should not be conflated. In some cases, embodiments address all of the deficiencies noted herein, but it should be understood that the inventions are independently useful, and some embodiments address only a subset of such problems or offer other, unmentioned benefits that will be apparent to those of skill in the art reviewing the present disclosure. Due to costs constraints, some inventions disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such inventions or all aspects of such inventions.

It should be understood that the description and the drawings are not intended to limit the invention to the particular form disclosed, but to the contrary, the intention is to cover all modifications, equivalents, and alternatives falling within the spirit and scope of the present invention as defined by the appended claims. Further modifications and alternative embodiments of various aspects of the invention will be apparent to those skilled in the art in view of this description. Accordingly, this description and the drawings are to be construed as illustrative only and are for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. The term "each" does not require "each and every," unless specifically indicated. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device.

The present techniques will be better understood with reference to the following enumerated embodiments:

1. A method, comprising: receiving, at a driver dispatch server system, a tank-nearly-full message indicating that a tank at an oil or gas related facility is or will be ready for a truck to unload and transport fluid accumulating in the tank; in response to the tank-nearly-full message, creating a tank-run record, the tank-run record specifying a tank-run and identifying the oil or gas related facility and indicating a need for a truck to unload and transport fluid; sending a description of the tank-run to a mobile device of a driver of an oilfield truck; receiving, from the mobile device of the driver of the oilfield truck, a tank-run claimed message indicating that the driver will drive to the oil or gas related facility and transport at least some of the fluid accumulating in the tank; and after the tank-run claimed message, performing steps comprising: confirming that the tank-run has not yet been claimed by another driver; after the confirmation, designating the tank-run as claimed by the driver; and sending confirmation to the mobile device of the driver that the tank-run has been claimed by the driver.
2. The method of embodiment 1, wherein the tank-nearly-full signal indicates: an identifier of an oil or gas well corresponding to a record in a data repository indicating an operator of the oil or gas well and a geolocation of the oil or gas well; a time at which the tank will be ready for the truck to haul away fluid, the time being determined based on a current reading from a fluid-level sensor on the tank, a tank capacity, and a rate of change in the reading from the fluid-level sensor on the tank; and a time at which the tank must be at least partially emptied to avoid affecting production of oil or gas from the oil or gas well.
3. The method of any of embodiments 1-2, wherein the tank-nearly-full signal is generated, at least in part, automatically by an Internet-connected sensor on the tank.
4. The method of any of embodiments 1-3, wherein sending a description of the tank-run to the mobile device of the driver comprises: receiving a geolocation of the mobile device from the mobile device; estimating a travel time or distance from the geolocation of the mobile device to the oil and gas related facility; and sending the estimated travel time or distance to the mobile device of the driver.

5. The method of any of embodiments 1-4, comprising: receiving data indicating whether fluid was unloaded from the tank within an acceptable duration of time; updating a profile of the driver based on the data; using the profile to hold the driver accountable for performance by: sending at least part of the profile to an operator of an oil or gas related facility in association with a user interface by which the operator whitelists or blacklists drivers; or delaying a description of a future tank-run sent to the driver such that other drivers are sent the description of the future tank run sooner than the driver.
6. The method of any of embodiments 1-5, comprising: before sending the description of the tank-run, identifying an operator of the oil or gas related facility and determining that the driver is pre-approved by the operator.
7. The method of any of embodiments 1-6, wherein tank-run is a tank-run to transport saltwater from the tank to a salt-water disposal facility, the method comprising: identifying a plurality of salt water disposal facilities that the driver has permission to use to dispose of salt water; ranking the plurality of salt water disposal facilities; and selecting at least some of the salt-water disposal facilities based on the ranking; and sending identifiers of the selected salt-water disposal facilities to the mobile device of the driver.
8. The method of embodiment 7, wherein sending the description of the tank-run to the mobile device of the driver of an oilfield truck comprises: calculating travel distance or time from the oil or gas related facility to a salt-water disposal facility among the plurality of salt-water disposal facilities; and sending data indicative of the travel distance or time to the mobile device of the driver.
9. The method of any of embodiments 7-8, wherein ranking the plurality of salt water disposal facilities comprises: calculating a score for each of the plurality of salt water disposal facilities based on a travel distance or travel time from the oil or gas related facility and an estimated unload time at the respective salt water disposal facility, wherein the estimated unload time is calculated based on a predicted arrival time of the driver at the respective salt-water disposal facility, a predicted arrival time at the respective salt-water disposal facility of other drivers who have claimed other tank-runs and selected the respective salt-water disposal facility, and an available tank capacity at the respective salt-water disposal facility indicated by an Internet-connected fluid-level sensor at the respective salt-water disposal facility.
10. The method of any of embodiments 1-9, comprising: calculating a load value based on a distance between the oil or gas related facility and an unload destination; calculating a travel time or distance based on a current geolocation of the mobile device received from the mobile device, a geolocation of the oil or gas related facility, and a geolocation of the unload destination; and sending an indication of the load value and travel time or travel distance to the mobile device of the trucker.
19. A tangible, non-transitory, machine-readable medium storing instructions that when executed by a data processing apparatus cause the data processing apparatus to perform operations comprising: the operations of any of embodiments 1-10.
20. A system, comprising: one or more processors; and memory storing instructions that when executed by the processors cause the processors to effectuate operations comprising: the operations of any of embodiments 1-10.

What is claimed is:

1. A system comprising:

one or more processors of a server system, and memory of the server system storing instructions that, when executed by the one or more processors, effectuate operations comprising:

forming, by the server system, a tank run record indicating a set of fluid transport tasks, the tank run record indicating fluid is to be transported from a first site to a second site, the first site or the second site having one or more sensors by which a fluid level in a tank is indicated;

accessing, by the server system, an account having information to display to a driver;

wirelessly sending, by the server system, a first message to a mobile computing device of the driver after the account is accessed;

caching, on the mobile computing device, first data of the first message in memory of the mobile computing device before the driver arrives at the first site;

obtaining, by the mobile computing device, a geolocation of the driver or vehicle indicated by the account with a geolocation sensor of the mobile computing device;

presenting, by the mobile computing device, a user interface on the mobile computing device based on the cached first data in response to determining, with the mobile computing device, based on the obtained geolocation, that the driver or vehicle has arrived at the first site;

wirelessly sending, by the mobile computing device, a second message from the mobile computing device to the server system after the driver or vehicle is determined to have arrived at the first site;

updating, by the server system, the tank run record to indicate that a first task of the set of fluid transport tasks was completed based on the second message from the mobile computing device;

wirelessly sending, by the mobile computing device, a third message from the mobile computing device to the server system after the driver or vehicle is determined to have arrived at the second site; and updating, by the server system, the tank run record to indicate that a second task of the set of fluid transport tasks was completed based on the third message from the mobile computing device, wherein:

the tank run record indicates that the first task is completed before the tank run record is updated to indicate that the second task was completed, and the tank run record indicates a change in the fluid level in the tank indicated by the one or more sensors.

2. The system of claim 1, wherein the account is a first account, and wherein accessing the first account comprises:

obtaining a plurality of candidate runs associated with a plurality of accounts, the plurality of accounts comprising the first account, a candidate run associated with the fluid transport from the first site to the second site;

each respective candidate run of the plurality of candidate runs is associated with a respective score of a set of scores; and selecting a first candidate run of the plurality of candidate runs based on the set of scores, wherein the first candidate run is associated with the first account.

3. The system of claim 1, the instructions further comprising:

sending a web message comprising a first location of the first site and a second location of the second site to a web server application program interface, wherein the first location is indicated to be a starting location, and wherein the second location is indicated to be a destination location; and receiving, in response to the web message, a geographical route between the first location and the second location; and displaying the geographical route on a user interface of the mobile computing device.

4. A tangible, non-transitory, machine-readable medium storing instructions that, when executed by one or more processors, effectuate operations comprising:

obtaining, by a mobile computer device from a server system, at least part of a tank run record indicating a set of tasks associated with a fluid-handling site, the set including one or more tasks;

accessing, by the mobile computing device, an account hosted by the server system based on information associated with the tank run record, wherein an entity is indicated by the account, and wherein at least one of a driver or vehicle is indicated as being associated with the entity;

wirelessly receiving, by the mobile computing device from the server system, a first message to the mobile computing device after obtaining the account and after a user of the mobile computing device logs into the account;

caching, by the mobile computing device, first data of the first message in memory of the mobile computing device, the caching occurring before the driver or vehicle associated with the entity arrives at the fluid-handling site;

obtaining, by the mobile computing device, an indication of a geolocation of the driver or vehicle with a sensor of the mobile computing device;

presenting, by the mobile computing device, a user interface that is based on the cached first data after the indication of a geolocation indicates the driver or vehicle arrived at the fluid-handling site; and wirelessly sending, by the mobile computing device to the server system, a second message from the mobile computing device to the server system after the driver or vehicle arrives at the fluid-handling site, wherein the second message is configured to cause the server system to update the tank run record to indicate that a task among the set of tasks was performed based on the second message from the mobile computing device.

5. The medium of claim 4, wherein the geolocation is determined with a geolocation sensor of the mobile computing device, the operations further comprising:

determining a geofence indicating a region encompassing the fluid-handling site based on the tank run record;

determining whether the driver or vehicle has arrived at the fluid-handling site by determining that the geolocation is within the geofence; and determining that the driver or vehicle has arrived at the fluid-handling site based on the determination that the geolocation is within the geofence.

6. The medium of claim 4, wherein:

updating the user interface comprises constructing a user interface element based the first data in response to a determination that the driver or vehicle has arrived at the fluid-handling site;

receiving user-provided data based on an interaction with the user interface element;

the operations further comprise caching the user-provided data in the memory of the mobile computing device; and the second message comprises the user-provided data obtained from the memory of the mobile computing device.

7. The medium of claim 6, wherein the user-provided data comprises an answer to a question displayed on the user interface, the operations further comprising:

determining whether the answer satisfies a set of criteria; and in response to the answer satisfying the set of criteria, sending a control signal to a controller of the fluid-handling site to actuate a valve or a pump.

8. The medium of claim 7, wherein the entity is associated with a driver assigned to perform the set of tasks, wherein sending the control signal comprises:

obtaining an access code associated with the driver stored on, or manually entered into, the mobile computing device;

determining whether the access code indicates that the driver is a designated driver; and in response to the access code satisfying a set of response criteria associated with the tank run record, sending the control signal.

9. The medium of claim 4, further comprising receiving, by the server system, a notification message from the mobile computing device indicating that the task was completed, wherein the mobile computing device sends the notification message without accessing a cellular network.

10. The medium of claim 4, the operations further comprising obtaining a tank measurement from a sensor at the fluid-handling site, wherein:

the tank measurement was sent to the mobile computing device via a first wireless network, wherein the first wireless network is not a cellular network; and the tank measurement was obtained from the mobile computing device via a second wireless network.

11. The medium of claim 4, wherein data collected from the fluid-handling site is stored on a site record of a database, the operations further comprising:

obtaining a sensor measurement of an amount of fluid change at the fluid-handling site, wherein the amount of fluid change indicates an amount by which a fluid is loaded or unloaded; and updating the site record associated with the fluid-handling site based on the sensor measurement.

12. The medium of claim 11, wherein:

the site record stores a plurality of sensor measurements of an amount of fluid unloaded at the fluid-handling site;

each respective sensor measurement of the plurality of sensor measurements is associated with a different time; and the operations further comprise:

obtaining a time period; and determining a cumulative amount of fluid change of the fluid-handling site based the plurality of sensor measurements.

13. The medium of claim 4, wherein the entity is associated with a driver assigned to perform the set of tasks, and wherein obtaining the account comprises:

obtaining a set of criteria based on the tank run record and an operator record associated with the fluid-handling site;

determining whether the driver satisfies the set of criteria based on a credential value of the account; and in response to a determination that the driver indicated by the account satisfies the set of criteria, selecting the account.

14. The medium of claim 4, the operations further comprising:

determining whether the vehicle indicated by the account is within a threshold boundary from the fluid-handling site based on the geolocation, wherein the threshold boundary may be one of a threshold distance, threshold time, geofence, or range of transmission of a wireless signal emitted from the fluid-handling site; and sending a control signal to a controller of the fluid-handling site in response to a determination that the vehicle is within the threshold boundary from the fluid-handling site, wherein the control signal causes at least one actuation of a valve or pump.

15. The medium of claim 4, wherein forming the tank run record comprises:

obtaining a sensor measurement of a fluid tank level at the fluid-handling site;

determining whether a tank level threshold or tank level change rate threshold is satisfied based on the sensor measurement; and in response to a determination that the sensor measurement satisfies the tank level threshold or the tank level change rate threshold, forming the tank run record.

16. The medium of claim 4, wherein the fluid-handling site is a first fluid-handling site, and wherein the set of tasks is associated with a second fluid-handling site, the operations further comprising:

obtaining a first site geolocation indicating a location of the first fluid-handling site;

obtaining a set of destination locations associated with a set of fluid-handling sites;

selecting a second fluid-handling site based on a distance between the first site geolocation and a destination location of the set of fluid-handling sites; and updating the tank run record based on an identifier of the second fluid-handling site.

17. The medium of claim 4, wherein the geolocation is a first geolocation, the operations further comprising:

obtaining a second geolocation with a global positioning system (GPS) sensor of the mobile computing device while the driver or vehicle is not at the fluid-handling site;

wirelessly sending, by the mobile computing device, the second geolocation to the server system;

obtaining a sensor measurement of a fluid level at the fluid-handling site;

determining whether the sensor measurement is anomalous based on a fluid level threshold; and in response to determining that the sensor measurement is anomalous, storing an indicator that the sensor measurement is anomalous.

18. The medium of claim 4, wherein:

obtaining the tank run record comprises steps for forming the tank run record; and obtaining the account comprises steps for obtaining the account.

19. The medium of claim 4, wherein caching the first data comprises:

determining an application context of the mobile computing device;

determining an allocated cache directory in the memory of the mobile computing device based on the application context; and storing the first data in the allocated cache directory, wherein the operations further comprise:

obtaining a sensor measurement from the fluid-handling site;

storing the sensor measurement in memory of the mobile computing device;

determining whether a wireless network is accessible to the mobile computing device, wherein the wireless network provides access to the server system; and sending the stored sensor measurement from the mobile computing device to the server system via the wireless network in response to a determination that the wireless network is accessible to the mobile computing device.

20. A method comprising:

obtaining, by a mobile computer device from a server system, at least part of a tank run record indicating a set of tasks associated with a fluid-handling site, the set including one or more tasks;

accessing, by the mobile computing device, an account hosted by the server system based on information associated with the tank run record, wherein an entity is indicated by the account, and wherein at least one of a driver or vehicle is indicated as being associated with the entity;

wirelessly receiving, by the mobile computing device from the server system, a first message to the mobile computing device after obtaining the account and after a user of the mobile computing device logs into the account;

caching, by the mobile computing device, first data of the first message in memory of the mobile computing device, the caching occurring before the driver or vehicle associated with the entity arrives at the fluid-handling site;

obtaining, by the mobile computing device, an indication of a geolocation of the driver or vehicle with a sensor of the mobile computing device;

presenting, by the mobile computing device, a user interface that is based on the cached first data after the indication of a geolocation indicates the driver or vehicle arrived at the fluid-handling site; and wirelessly sending, by the mobile computing device to the server system, a second message from the mobile computing device to the server system after the driver or vehicle arrives at the fluid-handling site, wherein the second message is configured to cause the server system to update the tank run record to indicate that a task among the set of tasks was performed based on the second message from the mobile computing device.

* * * * *